United States Patent [19]

Pischtschan et al.

[11] 4,217,266
[45] Aug. 12, 1980

[54] PIGMENT PREPARATIONS

[75] Inventors: Alfred Pischtschan, Kuerten; Karlheinz Wolf, Leverkusen; Reinhold Hörnle, Cologne; Fritz Bremer, Leverkusen; Bernhard Arnold, Pulheim; Werner Kullick, Leverkusen, all of Fed. Rep. of Germany

[73] Assignee: Bayer Aktiengesellschaft, Leverkusen, Fed. Rep. of Germany

[21] Appl. No.: 2,792

[22] Filed: Jan. 11, 1979

[30] Foreign Application Priority Data

Jan. 13, 1978 [DE] Fed. Rep. of Germany ....... 2801315

[51] Int. Cl.$^2$ ............................................... C08K 9/04
[52] U.S. Cl. ............................. 260/42.21; 260/42.56
[58] Field of Search ........................... 260/42.16, 42.56

[56] References Cited

U.S. PATENT DOCUMENTS

| | | | |
|---|---|---|---|
| 3,117,943 | 1/1964 | Corbiere et al. | 260/42.16 |
| 3,346,535 | 10/1967 | Dekking | 260/42.16 |
| 3,385,808 | 5/1968 | von Bonin et al. | 260/42.56 X |
| 3,462,390 | 8/1969 | Dunn | 260/42.56 |
| 4,017,452 | 4/1977 | Schwarz | 260/42.56 |
| 4,127,422 | 11/1978 | Guzi et al. | 260/42.56 X |

Primary Examiner—Sandra M. Person
Attorney, Agent, or Firm—Sprung, Felfe, Horn, Lynch & Kramer

[57] ABSTRACT

A pigment preparation containing a pigment, a nonionic surface-active agent and, as a thermoplastic finishing agent, a copolymer which has an average molecular weight of 80,000 to 160,000 and consists of 90–50% by weight of α-methylstyrene and 10–50% by weight of acrylonitrile, and its use for the mass coloring of thermoplastic moulding compositions.

14 Claims, No Drawings

PIGMENT PREPARATIONS

The invention relates to pigment preparations for the mass coloring of thermoplastic moulding compositions based on elastic-thermoplastic graft copolymer mixtures derived from a rubber (ABS plastics), containing a pigment, a non-ionic surface-active agent and a thermoplastic finishing agent, random copolymers which consist of 90 to 50% by weight of α-methylstyrene and 10 to 50% by weight of acrylonitrile and have an average molecular weight of 80,000 to 160,000, preferably of 90,000 to 130,000 and especially of 100,000 to 110,000, being used as the thermoplastic finishing agent.

The finishing agents preferably contain 65 to 75% by weight of α-methylstyrene and 35 to 25% by weight of acrylonitrile.

Colorants are added to ABS plastics, depending on the desired colour of the article to be manufactured. In many cases, the colorants are pigments which, depending on their chemico-physical character, interact in various ways amongst themselves and with the polymers. Because of high cohesion forces between the pigment particles, the particles can be distributed in an optimum manner only with great difficulty, so that in many cases a considerable proportion of the pigments remains non-dispersed, in the form of agglomerates. The essential adverse effects on the pigmented plastic are the unsatisfactory depth of colour and the reduced toughness of the mouldings.

It is not possible to distribute the pigment in a small portion of the ABS plastic, which is then mixed with a large amount of the ABS plastic (masterbatch process), since pigments can be dispersed in ABS plastics only with difficulty. This is particularly true in the case of carbon black. Pigment preparations used hitherto, which contain cellulose esters as the finishing agents, have the disadvantage that small proportions of the cellulose esters split back into cellulose and the corresponding acids, which leads to odour nuisance, for example due to butyric acid or acetic acid.

The pigment preparations according to the invention do not exhibit this disadvantage and, because they are very readily dispersible in the ABS moulding compositions, result in complete utilisation of the tinctorial strength of the pigments and preservation of the toughness of the plastic. Furthermore, in many cases the quality of the surfaces of the mouldings is also improved, mostly in the direction of higher gloss and increased accuracy of the impression of the mould surfaces.

The ABS plastics in the sense of this invention are in themselves known, and consist of:

1. 25 to 100% by weight of a graft copolymer consisting of a
   1.1. rubber, onto which a
   1.2. monomer mixture of
      1.2.1. 95 to 50% by weight of styrene and
      1.2.2. 50 to 5% by weight of acrylonitrile, methyl methacrylate or mixtures thereof, has been polymerised and
2. 75 to 0% by weight of a copolymer of
   2.1. 95 to 50% by weight of styrene or α-methylstyrene, or mixtures thereof, and
   2.2. 50 to 5% by weight of acrylonitrile, methacrylonitrile, methyl methacrylate or mixtures thereof, in which (a) the weight ratio of (1.1) rubber to (1.2) monomer mixture is 85:15 to 40:60, (b) the graft copolymer (1.) in the moulding composition consists of particles with an average diameter of 0.05 to 5μ, preferably 0.2 to 1.0μ, and (c) the moulding composition contains 10 to 35% by weight, preferably 10 to 30% by weight, of the rubber (1.1).

Examples of suitable rubbers are diene rubbers, such as homopolymers of butadiene and isoprene, or copolymers thereof with up to 20% by weight of styrene. Ethylene/propylene terpolymers (EPDM rubbers) are also suitable. These products are built up from ethylene units and propylene units in the ratio of 20:80 to 80:20 and contain, as the third component, a non-conjugated diene. This third component is present in amounts of up to 15% by weight. It preferably consists of norbornadiene, hexa-1,5-diene or ethylidenenorbornene. In the graft polymerisation of the monomer mixture mentioned onto the rubber, as a rule 20 to 100% of the monomers present are grafted on by polymerisation. The remainder undergoes copolymerisation.

The weight ratio of rubber to monomers which have been grafted on by polymerisation must be 85:15 to 40:60. The graft polymers must be present in the moulding composition in the form of particles with an average diameter of 0.05 to 5μ preferably 0.2 to 1μ.

ABS graft copolymers can be prepared by customary techniques, for example by emulsion polymerisation according to the statements of German Auslegeschriften (German Published Specifications) Nos. 1,247,665 and 1,269,360.

Suitable pigments are, in particular, organic pigments, for example those of the azo, anthraquinone, azaporphine, thioindigo or polycyclic series, and furthermore of the quinacrodone, dioxazine or naphthalenetetracarboxylic acid series, as well as dyestuff lakes, such as Ca, Mg and Al lakes of dyestuffs containing sulphonic acid groups and/or carboxylic acid groups, a large number of these pigments being known, for example, from the Colour Index, 2nd edition, and inorganic pigments, such as zinc sulphides, cadmium sulphides/selenides, ultramarine, titanium oxides, iron oxides, nickel titanium yellow or chromium titanium yellow, cobalt blue, chromate pigments and, in particular, carbon black.

The pigment preparations contain 25 to 80% of pigment, preferably 30 to 50% of organic pigment or carbon black, 1 to 25%, preferably 5 to 15%, of non-ionic surface-active agent and 19 to 70%, preferably 30 to 60%, of the thermoplastic finishing agent.

These pigment preparations are appropriately produced by kneading the components in a kneader which can be heated, for example in a dispersion kneader, at a temperature which should be sufficiently high that a viscous, kneadable mass is obtained, preferably at temperatures between 80° and 150° C. Instead of the kneader, it is also possible to use roll mills or kneading screws.

Adducts of ethylene oxide and/or propylene oxide with long-chain or cycloaliphatic alcohols, amines or carboxylic acids, or, preferably, with alkylphenols, are preferably employed as the non-ionic surface-active agents. A large proportion of these compounds is described in N. Schönfeldt, Oberflächenaktive Anlagerungsprodukte des Äthylenoxids (Surface-active Addition Products of Ethylene Oxide), Wiss. Verlagsgesellschaft, Stuttgart, 1959. Further possible non-ionic surface-active agents are, inter alia, fatty acid esters of polyhydric alcohols, such as glycerol, sorbitol or glucose.

Examples of non-ionic surface-active agents which are used are ethylene oxide adducts of 3 to 50 mols of ethylene oxide with nonylphenol, oleyl alcohol, (coconut alkyl)-amine, phenylethylphenol or benzylhydroxydiphenyl, and with Mannich condensation products of nonylphenol, formaldehyde and cyclohexylamine or hexamethylenediamine.

The thermoplastic finishing agents are prepared by techniques which are in themselves known, for example by emulsion polymerisation.

EXAMPLE 1

A pigment preparation consisting of 35% of carbon black (surface area, measured by the BET method, of 230 m²/g), 5% of a reaction product of 1 mol of nonylphenol and 6 mols of ethylene oxide, 6% of a reaction product of 1 mol of nonylphenol and 10 mols of ethylene oxide and 54% of a copolymer obtained from 69% of α-methylstyrene and 31% of acrylonitrile is produced as follows:

The mixture of the copolymer and the ethylene oxide adducts and ¼ of the amount of carbon black are kneaded in a dispersion kneader, which can be heated and cooled, employing the Werner and Pfleiderer system, under steam heating (140° C.), until a viscous mass is formed. The remainder of the carbon black is then added in 3 portions at a kneading temperature of 120° to 130° C. and the mixture is kneaded for a further 15 minutes at a temperature of 110° to 120° C. After cooling, the mixture is ground to a powder.

EXAMPLE 2

The advantages of the finished carbon black described in Example 1 compared with the corresponding non-finished carbon black are shown in the coloring of the following types of ABS (A=acrylonitrile, B=butadiene, S=styrene, AMS=α-methylstyrene):

I. Standard type (comparison samples A1 to A3 in the table); average molecular weight 110,000 to 160,000.

An ABS of average characteristic values and with good processability. The A:B:S monomer ratio is 23:13:64. 100 g thereof contain 2 g of bis-(stearoyl-palmitoyl)-ethylenediamine as a lubricant (designated "wax" in the following text).

II. Type with good flow (comparison samples B1 to B3 in the table); average molecular weight 90,000 to 120,000.

An ABS of particularly good flow, which is obtained at the cost of slightly reduced toughness; A:B:S=25:20:55. Lubricant: 3% of wax.

III. Type with good toughness (comparison samples C1 to C3 in the table), average molecular weight 110,000 to 160,000.

An ABS highly elasticated by an increased content of polybutadiene graft polymer. A:B:S=19:31:50. Lubricant: 3% of wax.

IV. Type with an elevated heat distortion point (comparison samples D1 to D3 in the table), average molecular weight 110,000 to 160,000.

A type of ABS which also contains α-methylstyrene, in addition to styrene. A:B:S:AMS=24:18:27:31. Lubricant: 3% of wax.

V. Type with a high heat distortion point (comparison samples E1-E3 in the table), A:B:S:AMS=26:13:9:52. Lubricant: 2% of wax.

The ABS formulations investigated were produced by compounding the ABS powder with the additives mentioned in the table on a 1 kg laboratory internal kneader.

Testing comprised:

1. Notched impact strength $a_k$ (KJ/m²) according to DIN 53,453 using small injection-moulded standard bars;
2. Ball indentation hardness $H_k$ 30″(MPa) according to DIN 53,456, using small injection-moulded standard bars;
3. Heat distortion point as the Vicat softening point (° C.) according to DIN 53,460 (process B), using small injection-moulded standard bars;
4. Carbon black distribution, microscopically, magnification of 125; evaluation: +=homogeneous distribution of carbon black, −=inhomogeneous distribution of carbon black;
5. Quality of the surface, examined on an injection-moulded article of large surface area provided with ribs and perforations, visual assessment using the evaluation sequence: +(+)/(−)−;
6. Relative depth of colour, measured on small injection-moulded sample sheets of size 60×40×2 mm, the same and twice the amount of carbon black being added in the comparison samples compared with the example;
7. Flow, by injection-moulding, in a flat spiral mould, the flow length in cm being given.

The comparison samples A1, B1, C1, D1 and E1 contain no carbon black, samples A2, A3, B2, B3, C2, C3, D2, D3, E2 and E3 contain non-finished carbon black and examples A4, B4, C4, D4 and E4 contain the finished carbon black described in Example 1.

Column (a) indicates the example or the comparison sample, column (b) indicates the type of ABS, column (c) indicates the amount of carbon black or finished carbon black in g which was added to, in each case, 100 g of ABS polymer and column (d) indicates the proportion of carbon contained in 100 g of the ABS.

As can be seen from the table, for the same or a lower overall amount of carbon black, the finishing according to the invention gives the most favourable pattern of properties in each case.

Table

| a | b | c | d | 1 | 2 | 3 | 4 | 5 | 6 | 7 |
|---|---|---|---|---|---|---|---|---|---|---|
| A 1 |   | °/oo | °/oo | 12 | 88 | 90 | °/oo | °/oo | °/oo | 46 |
| A 2 | I | 1.5 | 1.5 | 9 | 93 | 91 | − | (+) | 100 | 48 |
| A 3 |   | 0.7 | 0.7 | 11 | 92 | 91 | − | (+) | 94 | 48 |
| A 4 |   | 2.0 | 0.7 | 12 | 92 | 91 | + | + | 103 | 48 |
| B 1 |   | °/oo | °/oo | 9 | 88 | 91 | °/oo | °/oo | °/oo | 52 |
| B 2 | II | 1.5 | 1.5 | 6 | 90 | 93 | − | + | 100 | 53 |
| B 3 |   | 0.7 | 0.7 | 8 | 89 | 93 | − | + | 97 | 53 |
| B 4 |   | 2.0 | 0.7 | 9 | 89 | 92 | + | + | 104 | 53 |
| C 1 |   | °/oo | °/oo | 20 | 67 | 88 | °/oo | °/oo | °/oo | 36 |
| C 2 | III | 1.5 | 1.5 | 16 | 72 | 89 | − | / | 100 | 36 |
| C 3 |   | 0.7 | 0.7 | 18 | 70 | 89 | − | / | 97 | 36 |
| C 4 |   | 2.0 | 0.7 | 19 | 69 | 89 | + | (+) | 102 | 36 |
| D 1 |   | °/oo | °/oo | 12 | 93 | 102 | °/oo | °/oo | °/oo | 37 |
| D 2 | IV | 1.5 | 1.5 | 8 | 96 | 103 | − | / | 100 | 39 |
| D 3 |   | 0.7 | 0.7 | 10 | 95 | 103 | − | / | 95 | 38 |
| D 4 |   | 2.0 | 0.7 | 12 | 94 | 102 | + | + | 104 | 38 |
| E 1 |   | °/oo | °/oo | 9 | 103 | 108 | °/oo | °/oo | °/oo | 33 |
| E 2 | V | 1.5 | 1.5 | 6 | 108 | 109 | − | / | 100 | 34 |
| E 3 |   | 0.7 | 0.7 | 8 | 107 | 108 | − | / | 96 | 33 |
| E 4 |   | 2.0 | 0.7 | 9 | 107 | 109 | + | (+) | 103 | 33 |

We claim:

1. Pigment preparation containing a pigment, a non-ionic surface-active agent and, as a thermoplastic finishing agent, a copolymer which has an average molecular weight of 80,000 to 160,000 and consists of 90–50% by weight of α-methylstyrene and 10–50% by weight of acrylonitrile.

2. Pigment preparation according to claim 1, containing a copolymer of 65–75% by weight of α-methylstyrene and 35 to 25% by weight of acrylonitrile as the finishing agent.

3. Pigment preparation according to claim 1, containing a copolymer of α-methylstyrene and acrylonitrile having an average molecular weight of 90,000 to 130,000 as the finishing agent.

4. Pigment preparation according to claim 1, containing a copolymer of α-methylstyrene and acrylonitrile having an average molecular weight of 100,000 to 110,000 as the finishing agent.

5. Pigment preparation according to claim 1, containing carbon black as the pigment.

6. Pigment preparation according to claim 1, containing 25 to 80% of pigment, 1 to 25% of non-ionic surface-active agent and 19 to 70% of thermoplastic finishing agent.

7. Pigment preparation according to claim 1, containing 30 to 50% of organic pigment or carbon black, 5 to 15% of non-ionic surface-active agent and 30 to 60% of thermoplastic finishing agent.

8. Pigment preparation according to claim 1, containing an adduct of ethylene oxide and/or propylene oxide with long-chain or cycloaliphatic alcohols, amines or carboxylic acids or with alkylphenols as the non-ionic surface-active agent.

9. Use of the pigment preparation according to claim 1 for the mass coloring of thermoplastic moulding compositions.

10. Use of the pigment preparation according to claim 1 for thermoplastic moulding compositions based on elastic-thermoplastic graft copolymer mixtures derived from a rubber.

11. A pigmented ABS composition comprising:
A.
  (1) 25 to 100 percent by weight of a graft copolymer consisting of a rubber, onto which a monomer mixture of 95 to 50 percent by weight of styrene and 50 to 5 percent by weight of acrylonitrile, methylacrylate or mixtures thereof has been polymerized and
  (2) 75 to 0 percent by weight of a copolymer of 95 to 50 percent by weight of stryene or α-methylstyrene or mixtures thereof and 50 to 5 percent by weight of acrylonitrile, methacrylonitrile, methacrylate or mixtures thereof in which the weight ratio of $A_1$ rubber to $A_2$ monomer mixture is 85:15 to 40:60, the graft copolymer comprising particles of an average diameter of 0.05 to 5μ
B. a pigment
C. a non-ionic surface active agent; and
D. as a thermoplastic finishing agent a copolymer which has an average molecular weight of 80,000 to 160,000 and consists of 90 to 50 percent by weight of α-methylstyrene and 10–50 percent by weight of acrylonitrile.

12. A pigmented ABS polymer composition according to claim 11 wherein said pigment is carbon-black.

13. A pigmented composition according to claim 12 wherein said non-ionic surface active agent is an adduct of ethylene oxide and/or propylene oxide with a long chain or cycloaliphatic alcohol, amine or carboxylic acid or with an alkyl phenol.

14. A composition according to claim 11 wherein the composition comprises 25 to 80 percent by weight of pigment, 1 to 25 percent by weight of non-ionic surface active agent and 19 to 70 percent by weight of thermoplastic finishing agent, the weight percentages being on the combined weights of components B, C and D.

* * * * *